Aug. 26, 1941.　　A. J. FISCHER　　2,254,176
LIQUID CLARIFICATION APPARATUS
Original Filed Dec. 15, 1937
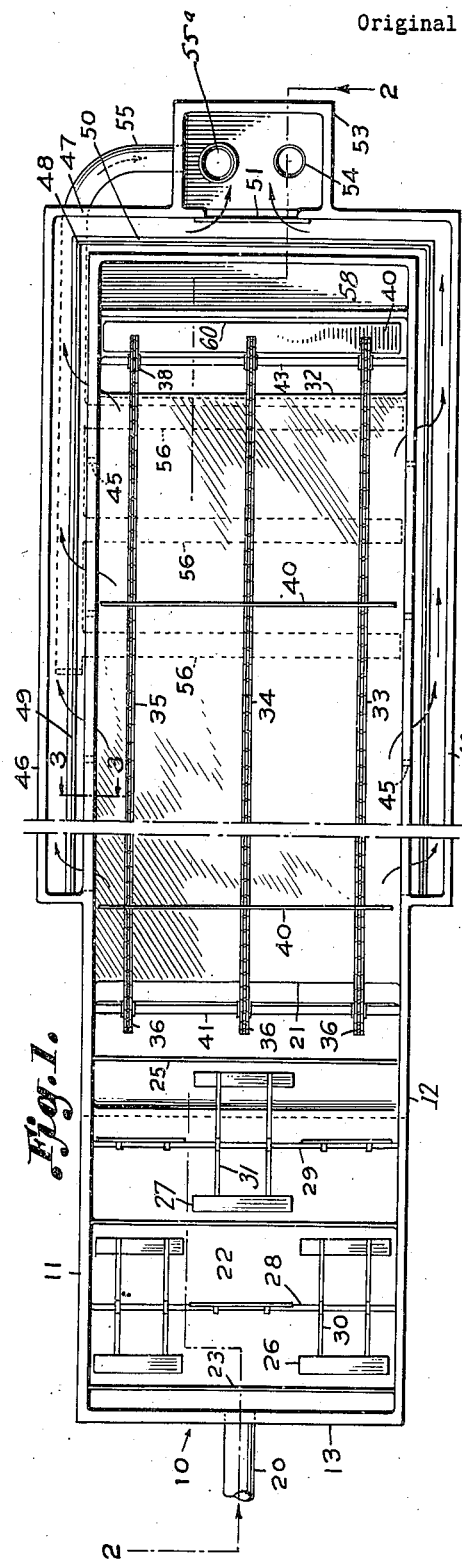
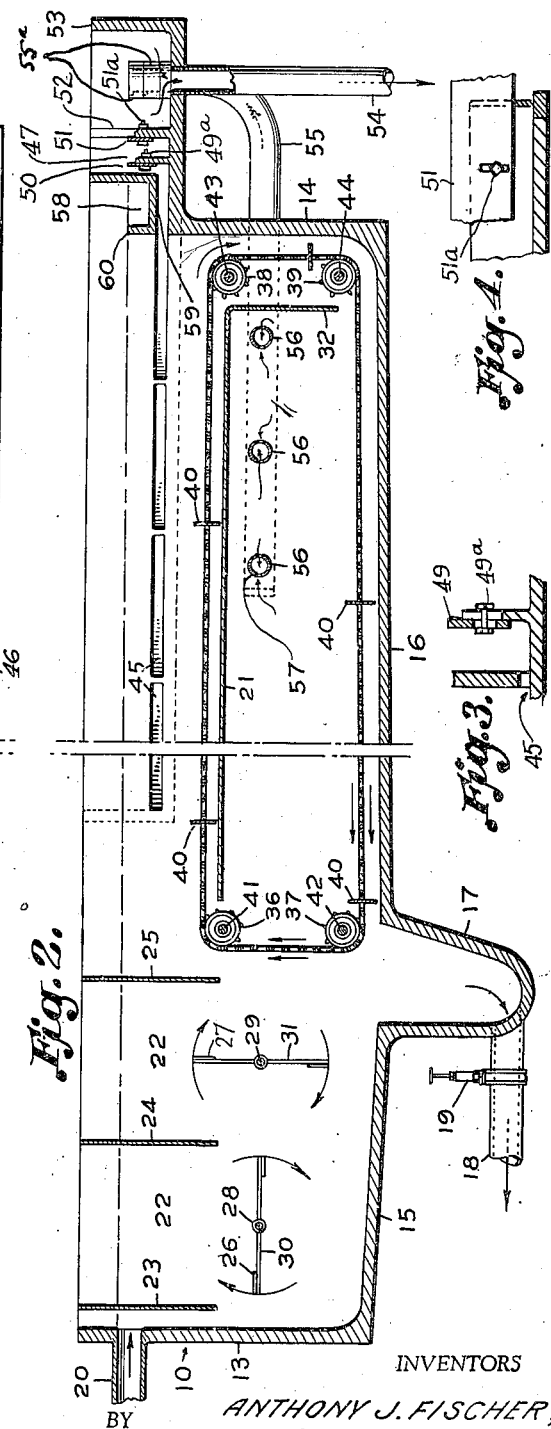
INVENTORS
ANTHONY J. FISCHER,
BY
ATTORNEY.

Patented Aug. 26, 1941

2,254,176

UNITED STATES PATENT OFFICE 2,254,176

LIQUID CLARIFICATION APPARATUS

Anthony J. Fischer, Flushing, N. Y., assignor to The Dorr Company, Inc., New York, N. Y., a corporation of Delaware Original application December 15, 1937, Serial No. 179,814, now Patent No. 2,233,448, dated March 4, 1941. Divided and this application April 6, 1940, Serial No. 328,294

7 Claims. (Cl. 210—3)

In the field of clarifying organically polluted liquids such as sewage, trade wastes and the like, there is often used today flocculation followed by clarification or, as it is sometimes called, sedimentation. This invention relates to a novel arrangement in the same tank or basin of a flocculation zone and a sedimentation zone wherein features of advantage lie in the design and relationship of parts thereof.

The polluted organic matter is suspended in the liquid. Most of it is settleable as sediment in the form of sludge, if the liquid be held in quiescence as in a sedimentation zone or clarifier. But a quantity of these suspended solids is so small as to be colloidal and therefore difficult to settle. Flocculation has lately been resorted to ahead of sedimentation for coagmenting or amassing suspended matter into floos or floc colonies and conditioning them as to denseness to make them more readily susceptible to settling in a classifier, along with the suspended solids that are normally settleable. By causing the flocs to meander in the liquid, there is a tendency for the flocs to entrap and adsorb other fine solids that may escape direct flocculating treatment.

The flocs thus formed are fragile and easily disintegrated so they must be treated gently, for if once disintegrated they are difficult of re-flocculation. Therefore, it is important that the floc-laden liquid be drifted or passed as unmolestedly as possible from the flocculation zone to the sedimentation zone.

Again, as a major part of these flocs comprises organic matter that is putrescible and subject to becoming septic, bottom or floor sweeping must be provided in the sedimentation zone for continually raking or impelling to discharge the sediment or sludge resulting from the sedimentation of floc-laden liquid. That is, care must be taken to avoid accumulations of organic solids if septic conditions are to be avoided in the apparatus.

The flocculating bladed means generally proposed for use in the combination apparatus may be found described in the patent to Smith, No. 1,893,451, and in the patent to Darby, No. 2,089,160, the latter being an improvement on the former. The type of traveling sediment or sludge impelling rakes, blades, or flights mainly proposed for sweeping the floor area or areas of the sedimentation zone clean of sludge accumulation may be considered blades or flights moved in closed paths about generally horizontal axes, so that sections of the closed paths are substantially horizontal. Such mechanisms are exemplified by what are called scraper conveyors, namely, two or more endless belts or chains taking around sprockets with flights or blades extending transversely from one chain to the other.

The novel features that I consider characteristic of my invention are set forth with particularity in the appended claims. The invention itself, however, both as to its organization and its method of operation, together with additional features, objects and advantages thereof, will be best understood from the following description of the illustrated specific embodiments thereof when read in connection with the accompanying drawing, in which—

Fig. 1 shows a plan view of the flocculator-clarifier unit;

Fig. 2 shows a longitudinal sectional elevation of the unit;

Fig. 3 is a vertical cross-sectional view taken as on the plane indicated by the line 3—3 of Fig. 1 and it typifies a bolt securing construction by which certain of the overflow weirs are held in vertically adjusted positions; and Fig. 4 is a view illustrating in elevation a bolt-securing means holding one of the overflow weirs in vertically adjusted position.

This application is a division of my parent application Serial No. 179,814, filed December 15, 1937 which matured into Patent No. 2,233,448, March 4, 1941 and said Figures 1 and 2 hereof are a reproduction of Figures 1 and 2 of the above identified parent application. The embodiment of the invention illustrated by said figures has a flocculation zone with flocculating mechanism operable therein on the one hand and a succeeding sedimentation zone with sediment-raking mechanism operable therein on the other hand and may be said to be characterized by the horizontal juxtaposition and novel arrangement of the flocculation zone and functioning instrumentalities thereof with reference to the horizontal succeeding sedimentation zone and functioning instrumentalities thereof.

Referring to the drawing, 10 designates the tank or basin of rectangular or oblong form and composed of vertical side walls 11 and 12, vertical end walls 13 and 14, and the bottom composed of sections 15 and 16 inclined slightly towards their adjacent ends and connected thereat by a sedimentation receiving sump. The section 15 of the bottom of the tank or basin inclines downwardly from the lower edge of the front or influent inlet end of the flocculator-clarifier unit to the sump 17, and the rear section 16 of the bottom of said unit inclines downwardly from the rear end wall 14 of the unit to the sump 17 which is disposed transversely of the tank or basin. The sump extends entirely across the tank or basin and is provided with a sediment or sludge discharge pipe 18 having a control valve 19.

The front end wall 13 is provided at the upper portion with an influent inlet or feed pipe 20, and the front section or portion of the tank or basin lying above the section 15 of the bottom of the same and above the sump 17 constitutes a flocculation zone, while the remainder of the tank or basin constitutes a sedimentation zone which is preferably provided with a sediment collecting tray 21 that is in effect a horizontal partial partition for forming a duplex sedimentation zone having superposed sedimentation collecting floor areas. The flocculator is placed ahead of the clarifier tray 21 and the upper portion of the flocculation zone is divided into separate compartments 22 by vertical transverse partial partitions or baffles 23, 24 and 25 extending entirely across the tank and downwardly from the upper edges of the side walls of the tank to a point approximately midway between the top and bottom of the tank. The baffles or partitions, which may be of any desired size and number, materially contribute to the control of the flow of liquid and quiescent condition of the flocculation zone, so that the movable blade flocculation means for coagmenting suspended material into settleable flocs may effect agitation to drift floc-laden liquid into the sedimentation zone without causing agitation sufficient to disintegrate the floc colonies formed in the flocculation zone.

The movable bladed flocculation mechanism comprises a plurality of paddles or blades 26 and 27 arranged in groups and extending transversely of the flocculation zone of the tank. The groups of blades or paddles 26 and 27 are mounted on shafts 28 and 29 which are journaled in suitable bearings in the side walls of the tank. Each of the shafts 28 and 29 carries three groups of blades or paddles which are located adjacent the side walls of the tank and centrally thereof, that is, midway between the side walls of the tank, but any number of groups of blades or paddles may, of course, be provided for each of the shafts and any number of shafts and paddles may be employed to suit the dimensions of the flocculator. The blades or paddles 26 are connected with the shaft 28 by arms or members 30, and the blades or paddles 27 are connected with the shaft 29 by similar arms or members 31. The blades of the side groups of each shaft are disposed in alignment, while the blades of the central group of each shaft are staggered with relation to the blades of the side groups. Any suitable means may be provided for rotating the shafts in the required speed to effect coagmentation of the suspended material into settleable flocs. The paddles or blades rotate in the direction of the arrows in Fig. 2 of the drawing, and the groups of blades or paddles operate in the lower portion of the flocculation zone, and each paddle or blade during a portion of its revolution extends into one or the other of the compartments 22 and sweeps across the bottom of such space or compartment, as clearly illustrated in Fig. 2 of the drawing. The blades move slowly through the lower portion of the flocculation zone, and the suspended material is caused to collect into settleable flocs of sufficient density to settle upon the sediment collecting tray or the bottom floor of the sedimentation zone when they are drifted into the same.

The sediment collecting tray which is disposed in substantially a horizontal position within the sedimentation zone extends entirely across the same and is located at a point intermediate of the top and the bottom thereof, and it is provided at its rear end with a depending vertical extension 32 which is spaced from the rear end wall 14 and which, with the rear end wall, defines a passage for the liquid and also for the sediment or sludge swept, scraped or raked from the tray 21 which constitutes an upper sludge collecting floor area. The means for scraping or raking sludge or sediment from the superposed floor areas formed by the tray and the section 16 of the bottom of the tank comprises spaced endless belts or chains 33, 34 and 35 arranged on front and rear sprocket wheels 36, 37, 38 and 39 and connected by transversely disposed blades or flights 40 which extend substantially entirely across the tank, so as to scrape or rake the entire upper surface of the tray 21 and the section 16 of the bottom of the tank. The blades 40 are connected intermediate of their longitudinal edges to the endless drag chains or belts, and one longitudinal edge of each of the blades scrapes or rakes the tray and the other longitudinal edge of each of the blades rakes or scrapes the section 16 of the bottom of the tank, as clearly illustrated in Fig. 2 of the drawing. The sprocket wheels 36, 37, 38 and 39 are mounted on horizontal shafts 41, 42, 43 and 44, and they are spaced apart in vertical and substantially horizontal alignment so that the blades or flights 40 travel in a closed path encircling the sediment collecting tray and having vertical and horizontal sections for impelling sediment to the sump 17 and the sediment discharge outlet 18. The flights or blades at the upper portion of the endless conveyor or scraper formed by said blades and chains pass over the tray in a direction concurrently with the flow through the tank, and the blades or flights at the lower portion of the endless scraper or conveyor travel over the section 16 of the bottom of the tank countercurrently to the flow of liquid in the tank. The blades or flights 40 continually scrape from the tray and the section 16 of the bottom of the tank, sediment or sludge accumulating on such floor areas, and by this continual removal of the sediment or sludge and the impelling of the same to the discharge outlet prevent any putrescible material from accumulating and producing septic conditions. While three endless chains or belts are shown in the illustrated embodiment of the invention, any desired number of chains or belts and blades or flights may be employed according to the dimensions of the tank or basin.

The flocs formed in the flocculation section or zone of the unit are drifted into the sedimentation zone without turbulence and while in the flocculation zone are caused to meander sufficiently in the liquid to form floc colonies of sufficient size and density to be settleable with the normally settleable material when the same reach the sedimentation zone. The sediment collecting tray forms a duplex sedimentation zone, and the sediment or sludge accumulating on the tray and on the floor of the sedimentation section of the unit is continually removed therefrom and impelled toward the sump 17 and the discharge outlet thereof. As any suitable means may be provided for actuating the endless scraper conveyor, illustration thereof is believed unnecessary.

The supernatant liquid or effluent is removed from the unit at the sedimentation zone by means of side outlet openings 45 formed in the side walls 11 and 12 and communicating with launders 46 extending longitudinally of the tank or basin at the clarifier section thereof and connected at the rear end of the unit by a transverse launder 47. The effluent passing through the outlet openings 45 flows over a weir 48 located in the launders and comprising longitudinal side portions 49 and a transverse connecting portion 50. The longitudinal and transverse portions 49 and 50 of the weir 48 are adjustable vertically to assist in controlling the level of the liquid within the tank or basin, but complete control of the level of the liquid is obtained by means of a vertically adjustable weir 51 located at the center of the outer wall of the transverse launder 47 at an effluent outlet opening 52. Figs. 3 and 4 are views illustrating a type of securing means by which the overflow weirs such as 49, 50 and 51 are rendered vertically adjustable and are held in vertically-adjusted position, to wit, by bolts such as 49a or 51a that pass through slotted portions provided in the overflow weir secured thereby, as for example, in overflow weir 49, 50 or 51, as the case may be. The transverse launder is provided with an effluent tank or receptacle 53, from which extends an effluent discharge pipe 54 and with which is also connected a longitudinal effluent conducting pipe 55 extending along one side of the clarifier section of the tank or basin and connected to a plurality of transversely disposed effluent outlet pipes 56 located beneath the sediment collecting tray and adapted to permit clarified supernatant liquid or effluent to flow from the tank or basin at spaced points below said tray. The transverse effluent outlet pipes 56 are provided at opposite sides with suitable apertures 57 through which the effluent may flow, as indicated by the arrows in Fig. 2 of the drawing. While three transverse effluent outlet pipes 56 are illustrated, the number may, of course, be varied. The effluent conducting pipe 55 extends horizontally from the innermost transverse pipe to a point beyond the rear end of the tank or basin and is then extended transversely to a point below the effluent outlet tank or receptacle 53, and it has an approximate vertical portion which extends through the bottom of said outlet tank or receptacle 53. The upturned portion of pipe 55 has the vertical height or level of its overflow or outlet made adjustable by means of a plurality of removable tubular rings 55a that are arranged to fit one on another. As the outlet pipes 56 are shown to merge into pipe 55, the adjustment of the vertical height of the terminal 55a of pipe 55, tends to control the outflow through all of the pipes 56.

The particular arrangement of the sediment collecting tray and the chain drag endless scraper or conveyor renders the clarifier section of the unit particularly susceptible for removal of scum from the liquid by skimming, and the tank or basin is provided at the rear or effluent discharge end with a transverse trough 58 located interiorly of the sediment or clarifier section of the tank or basin at the rear wall thereof adjacent the transverse launder 47 and consisting of a bottom wall 59 and an inner side wall 60 having its upper edge located substantially at the level of the liquid within the tank or basin. The inner wall of the transverse launder 47 forms one of the side walls of the trough 58 and any suitable means may be employed for the removal of scum from the trough, and such removal may be effected without any material effect on the quiescent condition of the liquid within the sedimentation zone or section of the tank or basin.

In the operation of the flocculator-clarifier unit, the normally colloidal or non-settleable solids are rendered settleable in the flocculation zone by forming floc nuclei, and these are subjected to mechanical agitation of the movable bladed flocculation means while in the flocculation zone, thereby causing coagmentation and amassment of the floc nuclei into colonies of size and density that render them readily settleable. The floc nuclei may, if desired, be initiated by chemical action, but this is not essential with the flocculator-clarifier unit of the present invention, as flocs will form in the relatively slow flow of liquid through the tank or basin and will be conditioned into settleable size mechanically by the movable bladed flocculation means. The flocs are fragile and easily disintegrable, and when once disintegrated are difficult to re-flocculate. The slow agitation of the liquid within the flocculation zone causes the flocs to be conditioned without danger of disintegration and the slow drift of the floc-laden liquid directly to the clarifier or sedimentation zone transfers the flocs from the flocculator or clarifier without disintegration. Also as the flocs are largely of organic material, they will spoil or go septic unless kept continually in motion and passed out of the unit promptly. The motor actuated flights or sludge scraping blades sweep sediment along the upper floor area formed by the tray and along the bottom of the sedimentation section of the tank, impelling the sludge to the discharge outlet, and travel so slowly as not to interfere with the quiescence in the settling or sedimentation zone. The flocculator-clarifier unit is adapted for treating sewage, trade wastes or other organically polluted liquids and may be advantageously employed for treating raw sewage or at any stage of sewage treatment where flocculation followed by sedimentation is desirable.

I claim:

1. Apparatus for clarifying liquids comprising a tank having in horizontal sequence a flocculation zone and a sedimentation zone in hydraulic communication with each other, influent means for incoming feed to the flocculation zone, bladed agitating means operable in repetitive paths in the flocculation zone at a speed sufficient to effect coagmentation of suspended material into settleable flocs, the floc-laden liquid being adapted to drift with the liquid from the flocculation zone into the sedimentation zone, a horizontal partition in the sedimentation zone representing a settling area which is superposed upon and spaced from the settling area represented by the tank bottom, both said settling areas corresponding to an upper and a lower settling zone respectively, impelling means for moving sediment from said settling areas to a common point of discharge in the tank, a sediment discharge outlet, outlet means comprising an overflow pipe for clarified supernatant liquid from said lower settling zone, outlet means comprising an overflow weir for clarified liquid from said upper settling zone, and a vertical transverse partition dividing the flocculation zone from the sedimentation zone and extending from a point above the liquid level downwardly into the liquid body to a point at least as low as the settling surface of the adjacent end-portion of the horizontal partition, said vertical partition being spaced from said adjacent end portion of the horizontal partition so as to leave an upward passage between them, the lower end of said vertical partition being spaced from the tank bottom so as to leave a horizontal flow passage through which the bulk of the floc-laden liquid flows, the relative arrangement of the partitions in the tank being such as to cause one component portion of said bulk to pass substantially horizontally through the lower settling zone towards said overflow pipe, and another component portion to pass first through said upward passage and then substantially horizontally through said upper settling zone toward said overflow weir.

2. Apparatus for clarifying organically polluted liquids comprising a tank having in hydraulic communication a forwardly disposed flocculation zone and a rearwardly disposed sedimentation zone of substantially the same operating depths and located in successive longitudinal sections of the tank, a horizontally-extending partition means extending across the tank and for a substantial length of the sedimentation zone but terminating short of the rear end wall of the tank and functionally dividing the sedimentation zone into upper and lower settling sections, influent means for incoming feed for the flocculation zone, outflow means for conducting clarified supernatant liquid from the upper portion of each of said settling sections of the sedimentation zone, a sediment discharge outlet leading from the lower interior portion of the tank, flocculation means providing movable blades operable in said flocculation zone at speed sufficient for effecting coagmentation of suspended material into settleable flocs and for effecting agitation sufficient to drift floc-laden liquid whereby some of the flocs drift into the lower settling section while other of the flocs drift into the upper settling section of the sedimentation zone, and means providing flights movable in a closed path having an upper horizontal section along which the flights operate within the space above said partition means for moving sediment rearwardly along said partition means and a lower horizontal section along which the flights operate within the space below said partition means for impelling sediment forwardly to said discharge outlet.

3. Apparatus for clarifying organically polluted liquids comprising a tank having in hydraulic communication a flocculation zone and a sedimentation zone horizontally disposed immediately behind the flocculation zone, influent means for distributing feed across the front end of the flocculation zone, a sediment-receiving sump provided in the vicinity of the rear end of the flocculation zone, the depth of which rear end of the flocculation zone is substantially the same as that of the front end of the sedimentation zone, a sediment-discharge conduit leading from said sump, means in said flocculation zone for agitating liquid therein, a horizontal transverse partition functionally dividing the sedimentation zone into upper and lower settling sections but terminating ahead of the rear wall of the tank, sludge-conveying flights movable in a closed path about said partition and having rearward horizontal movements above the partition, downward movements past the partition, forward longitudinal movements below the partition and upward movements past the partition and functioning to transfer sedimented material rearwardly above said partition and forwardly below said partition ultimately to said sump, outflow means comprising a horizontally-extending vertically-disposed weir past which supernatant liquid overflows from the rear upper portion of the sedimentation zone and also comprising perforated pipes disposed below the partition and mergingly terminating in an upturned section rising to an elevation approximately the same as that of said overflow weir, and a transverse baffle extending across the rear end portion of the flocculation zone and downwardly from an elevation at least as high as said weir to an elevation approximately that of the partition and spacedly disposed ahead of the front end of said partition sufficiently to permit an unobstructed passage of the sludge conveying flights as they move through the space between said baffle and said partition.

4. Apparatus for clarifying organically polluted liquids comprising a tank having in hydraulic communication and horizontal serial arrangement a forwardly disposed flocculation zone and a rearwardly disposed sedimentation zone and with respect to which the proximate end portions of said zones are of substantially the same depth, influent means for supplying incoming feed to the forward end portion of the flocculation zone, a sediment discharge outlet leading from the lower interior portion of the tank from the region in the vicinity of the rear end of the flocculation zone and the forward end of the sedimentation zone, flocculation means comprising bladed elements operable at speeds conducive to the development of flocculatable matter into settleable flocs, a tray functionally dividing said sedimentation zone into upper and lower settling sections and provided by a transversely and longitudinally-extending floor member and an apron member depending downwardly from the rear end of said floor member but spaced somewhat ahead of the rear wall of the tank, means providing bladed flights movable in a closed path encircling the tray and arranged whereby the flights scrape sediment rearwardly along the floor section of the partitioning means and scrape sediment forwardly along the bottom of the tank whereby the scraped sediment is ultimately received in the immediate region of said discharge outlet, outflow means for conducting supernatant liquid from said upper settling section, and outflow means for conducting supernatant liquid from that upper portion of said lower settling section which is immediately ahead of the depending apron, at least one of said outflow means having a vertically positionable overflow weir whereby the outflowing quantity of supernatant liquid from one of said settling sections relative to the other can be adjusted according to the positioning of said weir.

5. Apparatus for clarifying organically polluted liquids comprising a tank having in hydraulic communication and in longitudinal serial arrangement a forwardly disposed flocculation zone and a rearwardly disposed sedimentation zone of which the bottom of the flocculation zone is at substantially the same elevation as that of the bottom of the sedimentation zone, influent means for delivering incoming feed into the flocculation zone, a sediment-receiving sump provided across the tank bottom in the region at the rear end of the flocculation zone and at the front end of the sedimentation zone, a sediment-discharge conduit leading from said sump, movable bladed flocculation means in said flocculation zone for coagmenting suspended material into settleable flocs and for effecting agitation sufficient to drift flocculating liquid into the sedimentation zone, a longitudinally and transversely extending sediment collecting tray disposed within the sedimentation zone and dividing the latter into vertically disposed settling sections, actuatable flights movable in a closed path extending rearwardly above the tray, thence downwardly past the rear end of the tray, thence forwardly along that portion of the tank bottom below the tray and finally upwardly past the forward end of the tray, supernatant liquid outflow means from the upper settling section of the sedimentation zone, an associated receptacle into which the outflow supernatant passes, and a second outflow means comprising longitudinally spaced transversely extending perforated pipes located below the tray and having a common upflow discharge conduit arranged for discharging effluent therefrom into the aforesaid receptacle.

6. Apparatus for clarifying organically polluted liquids comprising a tank having in hydraulic communication a flocculation zone and a sedimentation zone, influent means for incoming feed for the flocculation zone, a sediment discharge outlet, movable bladed flocculation means in said flocculation zone for coagmenting suspended material into settleable flocs and for effecting agitation sufficient to drift floc-laden liquid into the sedimentation zone, a sediment collecting horizontal tray in the sedimentation zone vertically spaced from the bottom thereof, longitudinal and transverse launders located at the upper portion of the sedimentation zone and communicating with the interior of the tank for outflow of clarified supernatant liquid, a plurality of longitudinally spaced transversely extending effluent outflow means located below the tray, a transverse scum receiving trough located at the upper portion of the tank at the rear end thereof, and actuated flights traveling in a closed path encircling the tray for impelling sediment rearwardly along the top of the tray and thereafter forwardly along the tank bottom to said discharge outlet.

7. Apparatus as defined in and by claim 6, according to which means is provided for adjusting the outflow of liquid through the effluent outflow means that is located below the tray relatively to the outflow through and from the launders.

ANTHONY J. FISCHER.